US011051011B2

(12) United States Patent
Lee

(10) Patent No.: US 11,051,011 B2
(45) Date of Patent: Jun. 29, 2021

(54) METHOD AND DEVICE FOR VIDEO SIGNAL PROCESSING

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/613,913

(22) PCT Filed: May 16, 2018

(86) PCT No.: PCT/KR2018/005583
§ 371 (c)(1),
(2) Date: Nov. 15, 2019

(87) PCT Pub. No.: WO2018/212577
PCT Pub. Date: Nov. 22, 2018

(65) Prior Publication Data
US 2020/0077086 A1 Mar. 5, 2020

(30) Foreign Application Priority Data
May 17, 2017 (KR) .......................... 10-2017-0061085

(51) Int. Cl.
H04N 19/105 (2014.01)
H04N 19/119 (2014.01)
H04N 19/159 (2014.01)
H04N 19/176 (2014.01)
H04N 19/70 (2014.01)

(52) U.S. Cl.
CPC ......... H04N 19/105 (2014.11); H04N 19/119 (2014.11); H04N 19/159 (2014.11); H04N 19/176 (2014.11); H04N 19/70 (2014.11)

(58) Field of Classification Search
None
See application file for complete search history.

(56) References Cited

U.S. PATENT DOCUMENTS

| 2011/0158315 | A1 | 6/2011 | Kim et al. |
| 2012/0106629 | A1 | 5/2012 | Zheng et al. |
| 2014/0133559 | A1 | 5/2014 | Kim et al. |
| 2014/0219339 | A1 | 8/2014 | Park |
| 2014/0219343 | A1 | 8/2014 | Park |
| 2015/0229943 | A1 | 8/2015 | Kim et al. |
| 2015/0365700 | A1 | 12/2015 | Kim et al. |
| 2016/0173879 | A1 | 6/2016 | Park |
| 2016/0173880 | A1 | 6/2016 | Park |
| 2016/0182908 | A1 | 6/2016 | Park |
| 2016/0182909 | A1 | 6/2016 | Park |

(Continued)

FOREIGN PATENT DOCUMENTS

| KR | 10-2015-0035873 A | 4/2015 |
| KR | 10-2017-0016015 A | 2/2017 |

(Continued)

Primary Examiner — Lindsay J Uhl
(74) Attorney, Agent, or Firm — IP Legal Services, LLC

(57) ABSTRACT

The image decoding method according to the present invention comprises the steps of determining an intra prediction mode of a current block, dividing the current block into a plurality of subblocks, and for the plurality of subblocks, sequentially performing intra prediction.

7 Claims, 10 Drawing Sheets

(56) References Cited

U.S. PATENT DOCUMENTS

| | | | |
|---|---|---|---|
| 2018/0070088 A1 | 3/2018 | Zheng et al. | |
| 2018/0098074 A1 | 4/2018 | Heo et al. | |
| 2018/0255299 A1 | 9/2018 | Lee et al. | |
| 2018/0352226 A1* | 12/2018 | An | H04N 19/12 |
| 2020/0275100 A1 | 8/2020 | Lee et al. | |
| 2021/0067779 A1 | 3/2021 | Lee et al. | |
| 2021/0067780 A1 | 3/2021 | Lee et al. | |
| 2021/0067781 A1 | 3/2021 | Lee et al. | |

FOREIGN PATENT DOCUMENTS

| | | | | |
|---|---|---|---|---|
| KR | 10-2017-0026276 A | | 3/2017 | |
| WO | 2013/005967 A2 | | 1/2013 | |
| WO | WO-2013005967 A2 | * | 1/2013 | H04N 19/11 |
| WO | 2013/062194 A1 | | 5/2013 | |
| WO | 2016/153146 A1 | | 9/2016 | |
| WO | WO-2016153146 A1 | * | 9/2016 | H04N 19/119 |

* cited by examiner

METHOD AND DEVICE FOR VIDEO SIGNAL PROCESSING

CROSS REFERENCE TO RELATED APPLICATIONS

This application is a National Stage Patent Application of PCT International Patent Application No. PCT/KR2018/005583 (filed on May 16, 2018) under 35 U.S.C. § 371, which claims priority to Korean Patent Application No. 10-2017-0061085 (filed on May 17, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

Disclosure

Technical Problem

An object of the present invention is intended to provide a method and an apparatus for efficiently performing intra prediction for an encoding/decoding target block in encoding/decoding a video signal.

An object of the present invention is intended to provide a method and an apparatus for performing intra prediction on the basis of a sub-block in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may decide an intra prediction mode of a current block, partition the current block into sub-blocks, and sequentially perform intra prediction for the sub-blocks. In this case, the sub-blocks may share an intra prediction mode of the current block.

A method and an apparatus for decoding a video signal according to the present invention may decide an intra prediction mode of a current block, partition the current block into sub-blocks, and sequentially perform intra prediction for the sub-blocks. In this case, the sub-blocks may share an intra prediction mode of the current block.

In a method and an apparatus for decoding a video signal according to the present invention, intra prediction of a first sub-block adjacent to the top boundary or the left boundary of the current block among a plurality of sub-blocks may be performed using a reference sample adjacent to the current block.

In a method and an apparatus for decoding a video signal according to the present invention, intra prediction of a second sub-block adjacent to the first sub-block among a plurality of sub-blocks may be performed using a reconstruction sample in the first sub-block as a reference sample.

In a method and an apparatus for decoding a video signal according to the present invention, a shape of a plurality of sub-blocks may be variably determined according to an intra prediction mode of the current block.

In a method and an apparatus for decoding a video signal according to the present invention, when an intra prediction mode of the current block is the vertical direction, the current block is partitioned so that a plurality of sub-blocks are arranged up and down, and when the intra prediction mode of the current block is the horizontal direction, the current block may be partitioned so that a plurality of sub-blocks are arranged left and right.

In a method and an apparatus for decoding a video signal according to the present invention, a shape of a plurality of sub-blocks may be determined based on a syntax element indicating a partitioning type of the current block.

In a method and an apparatus for decoding a video signal according to the present invention, a plurality of sub-blocks may be obtained by dividing the current block into columns or rows.

In a method and an apparatus for decoding a video signal according to the present invention, whether to partition the current block into a plurality of sub-blocks may be determined according to a size, a shape or an intra prediction mode of the current block.

The features briefly summarized above for the present invention are only illustrative aspects of the detailed description of the invention that follows, but do not limit the scope of the invention.

Advantageous Effects

According to the present invention, an efficient intra prediction may be performed for an encoding/decoding target block.

According to the present invention, there is an advantage of increasing the efficiency of intra prediction by performing intra prediction on the basis of a sub-block.

The effects obtainable by the present invention are not limited to the above-mentioned effects, and other effects not mentioned can be clearly understood by those skilled in the art from the description below.

MODE FOR INVENTION

Figure 1:
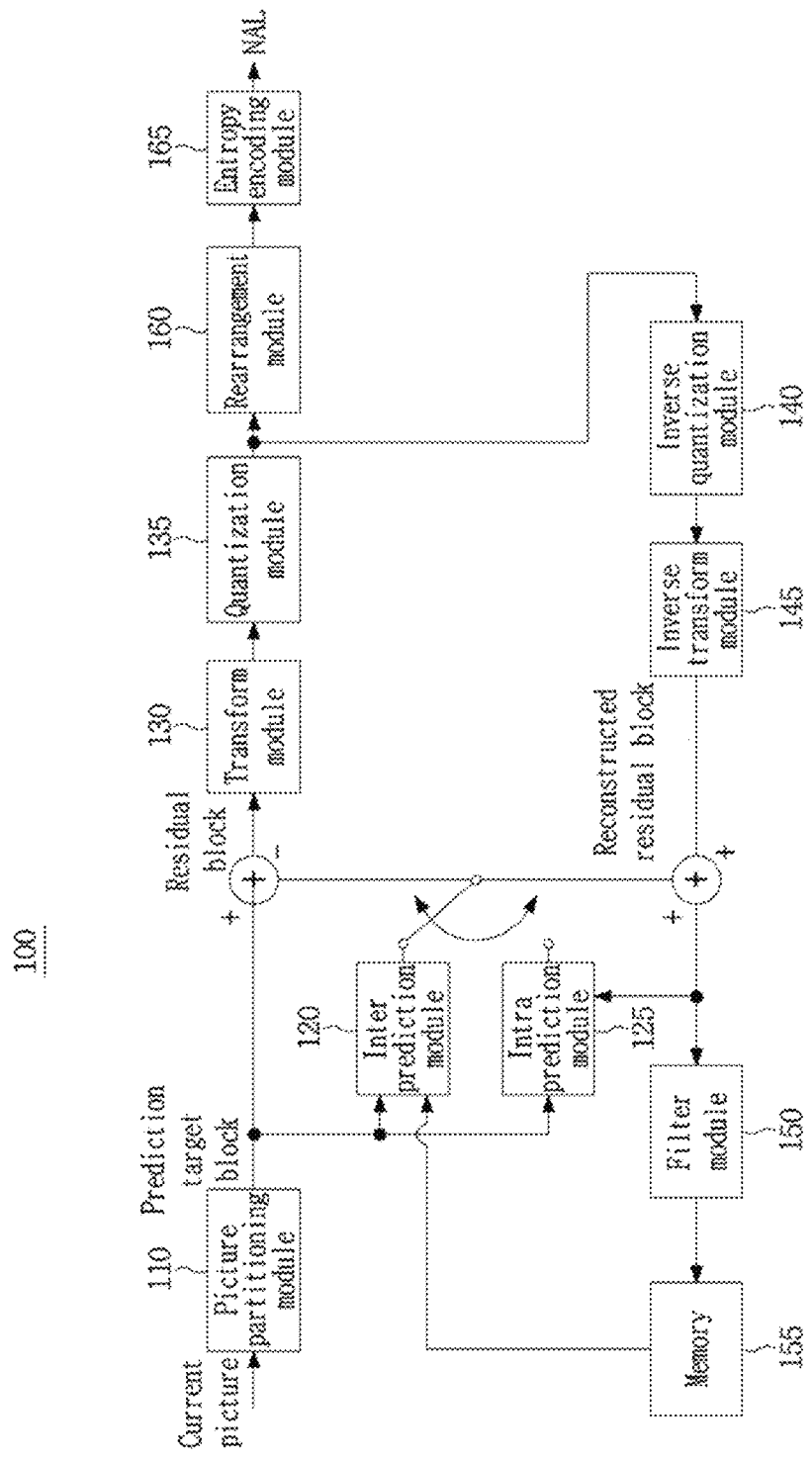
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

When a prediction unit performing intra prediction based on a coding unit is generated and the coding unit is not the smallest coding unit, intra prediction may be performed without partitioning the coding unit into a plurality of prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. A type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
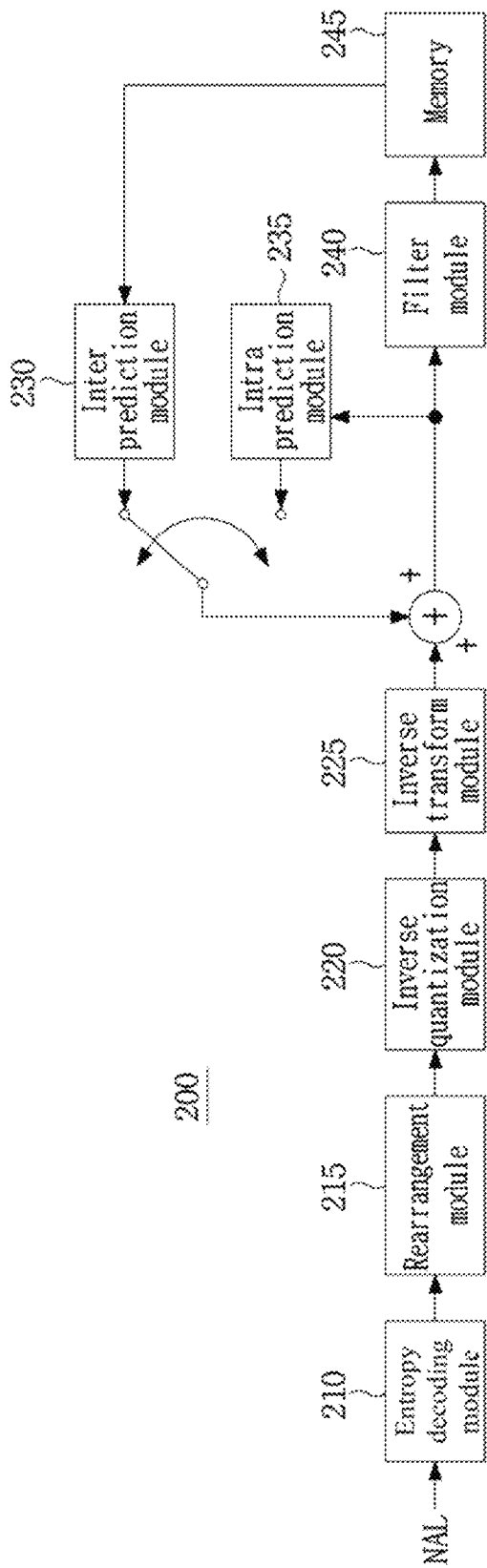
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by partitioned into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be partitioned into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively partitioned or partitioned into base units for performing prediction, quantization, transform, or in-loop filtering, or the like. For example, a partition of arbitrary size generated by dividing the coding unit may be defined as a coding unit, or may be defined as a transform unit or a prediction unit, which is a base unit for performing prediction, quantization, transform, in-loop filtering, or the like.

Partitioning of a coding tree unit or a coding unit may be performed based on at least one of the vertical line or the horizontal line. In addition, the number of vertical lines or horizontal lines partitioning the coding tree unit or the coding unit may be at least one or more. For example, the coding tree unit or the coding unit may be partitioned into two partitions using one vertical line or one horizontal line, or the coding tree unit or the coding unit may be partitioned into three partitions using two vertical lines or two horizontal lines. Alternatively, the coding tree unit or the coding unit may be partitioned into four partitions having a length and the width of ½ by using one vertical line and one horizontal line.

When a coding tree unit or a coding unit is partitioned into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is partitioned into a quad tree structure, a triple tree structure, or a binary tree structure. However, it is also possible to partition a coding tree unit or a coding unit using a larger number of vertical lines or a larger number of horizontal lines.

Figure 3:
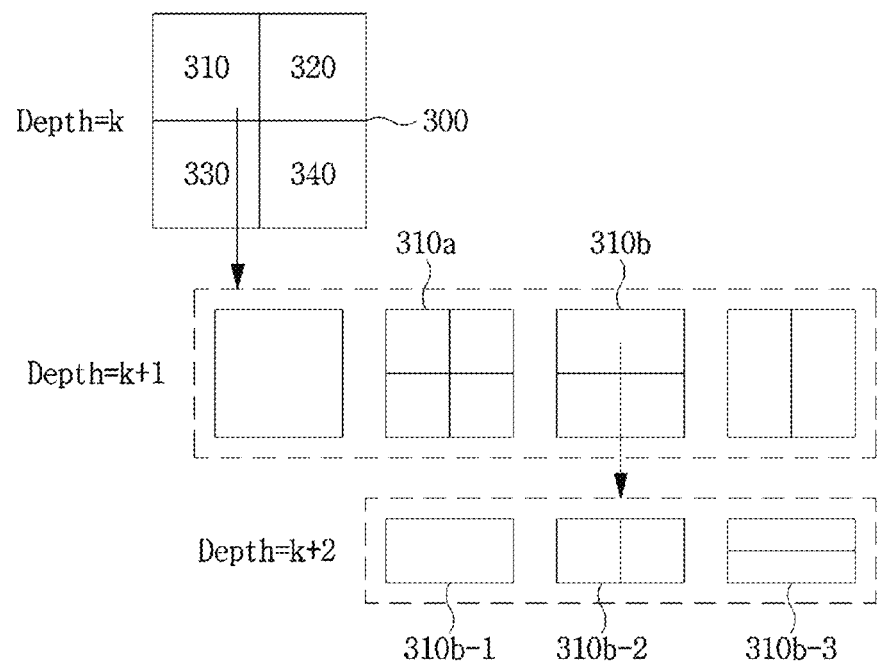
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined on the basis of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree, a triple tree, or a binary tree. Here, quad tree-based partitioning may mean that a 2N×2N coding block is partitioned into four N×N coding blocks, triple tree-based partitioning may mean that one coding block is partitioned into three coding blocks, and binary-based partitioning may mean that one coding block is partitioned into two coding blocks. Even if the triple-based partitioning or the binary tree-based partitioning is performed, a square-shaped coding block may exist in the lower depth. Also, after the triple-based partitioning or the binary-based partitioning is performed, generating a square-shaped coding block may be limited in a lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. At least one of quad tree-based partitioning, triple tree-based partitioning, or binary tree-based partitioning may no longer be performed on the coding block partitioned based on the binary tree.

Alternatively, the triple tree-based partitioning or the binary tree-based partitioning may be allowed for the coding block partitioned based on the binary tree, but only one of the horizontal or vertical partitioning may be limitedly allowed.

For example, an additional partition or an additional partition direction may be limited for a coding block partitioned based on the binary tree according to a location, an index, a shape, or an additional partition type of a neighboring partition of the coding block partitioned based on the binary tree, or the like. For example, when an index of the coding block that precedes the coding order among the two coding blocks generated by the binary tree based-partitioning is 0 (hereinafter referred to as coding block index 0) and an index of the coding block that follows the coding order among the two coding blocks generated by the binary tree-based partitioning is 1 (hereinafter referred to as coding block index 1), in the case where the binary tree-based partitioning is applied to all coding blocks having a coding block index of 0 or a coding block index of 1, the binary tree-based partitioning direction of the coding block having the coding block index of 1 may be determined according to a binary tree-based partitioning direction of the coding block having the coding block index of 0. Specifically, when the binary tree-based partitioning direction of the coding block having the coding block index of 0 is to partition the coding block having the coding block index of 0 into square partitions, binary tree-based partitioning of the coding block having the coding block index of 1 may be limited to have a different direction from binary tree-based partitioning of the coding block having a coding block index of 1. Thus, the coding blocks having the coding block index of 0 and the coding block index of 1 may be restricted from being partitioned into square partitions. In this case, encoding/decoding of information indicating the binary tree partitioning direction of the coding block having the coding block index of 1 may be omitted. This is because partitioning all of the coding blocks having the coding block index of 0 and the coding block index of 1 into square partitions has the same effect as partitioning the upper depth block on the basis of a quad tree, so that allowing partitioning of all into square partitions is undesirable in terms of coding efficiency.

Triple tree-based partitioning means partitioning a coding block into three partitions in the horizontal or vertical direction. All three partitions generated due to triple tree-based partitioning may have different sizes. Alternatively, two of the partitions generated due to triple tree-based partitioning may have the same size, and the other one may have a different size. For example, the width ratio or height ratio of partitions generated as the coding block is partitioned may be set to 1:n:1, 1:1:n, n:1:1 or m:n:1 depending on the partitioning direction. Here, m and n may be 1 or a real number greater than 1, for example, an integer such as 2.

Triple tree-based partitioning may be performed on a coding block in which quad tree-based partitioning is no longer performed. For the coding block partitioned based on the triple tree, at least one of quad tree-based partitioning, triple tree-based partitioning, or binary tree-based partitioning may be set to no longer be performed.

Alternatively, triple tree-based partitioning or binary tree-based partitioning may be allowed for the coding block partitioned based on the triple tree, but only one of horizontal or vertical partitioning may be limitedly allowed.

For example, an additional partition or an additional partition direction may be limited for a coding block partitioned based on the triple tree according to a location, an index, a shape, or an additional partition type of a neighboring partition of the coding block partitioned based on the triple tree, or the like. For example, one of horizontal division or vertical division may be limited to a partition having the largest size among coding blocks generated due to triple tree-based partitioning. Specifically, the largest partition among coding blocks generated due to triple tree-based partitioning may not allow binary tree partitioning in the same direction or triple tree partitioning direction in the same direction as the triple tree partitioning direction of the upper depth partition. In this case, encoding/decoding of information indicating the binary tree partitioning direction or the triple tree partitioning direction may be omitted for the largest partition among the coding blocks partitioned based on the triple tree.

The partitioning in the lower depth may be determined depending on the partitioning type of the upper depth. For example, when binary tree-based partitioning is allowed in two or more depths, only a binary tree-based partitioning of the same type as a binary tree partitioning of an upper depth may be allowed in a lower depth. For example, when the binary tree-based partitioning is performed in the 2N×N type in the upper depth, the binary tree-based partitioning in the 2N×N type may be performed in the lower depth. Alternatively, when binary tree-based partitioning is performed in an N×2N type in an upper depth, N×2N-type binary tree-based partitioning may be allowed in a lower depth.

Conversely, it is also possible to allow only binary tree-based partitioning having a different type from the binary tree partitioning of the upper depth in the lower depth.

For a sequence, a slice, a coding tree unit, or a coding unit, it may be limited to use only a special type of binary tree-based partitioning or a special type of triple tree-based partitioning. For example, it may be limited to allow only 2N×N or N×2N type binary tree-based partitioning for a coding tree unit. The allowed partitioning type may be predefined in the encoder or the decoder, and information about the allowed partitioning type or the not allowed partitioning type may be encoded and signaled through a bitstream.

Figure 5A:
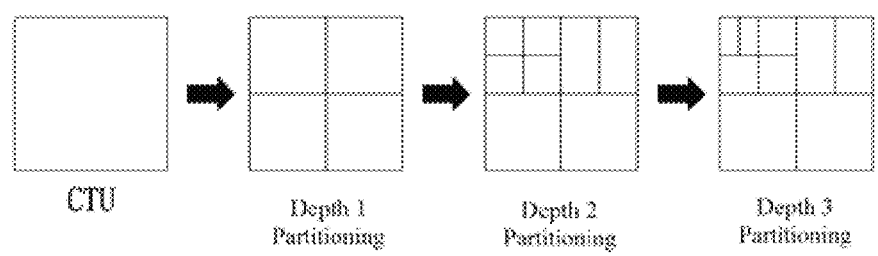
FIGS. 5A and 5B are a diagram illustrating an example in which only a binary tree-based partition of a pre-determined type is allowed according to an embodiment of the present invention.
Figure 5B:
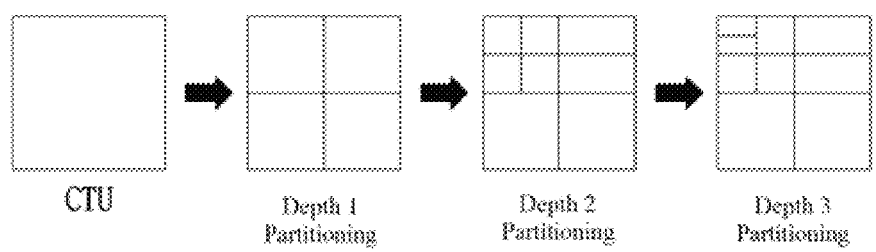

FIGS. 5A and 5B are a diagram illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on a size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in the vertical direction or the horizontal direction, etc. may be used.

In addition, information on the number of times a binary/triple tree partitioning is allowed, a depth in which the binary/triple tree partitioning is allowed, or the number of the depths in which the binary/triple tree partitioning is allowed may be obtained for a coding tree unit or a specific coding unit. The information may be encoded on the basis of a coding tree unit or a coding unit, and may be transmitted to a decoder through a bitstream.

For example, a syntax 'max_binary_depth_idx_minus1' indicating a maximum depth in which binary tree partitioning is allowed may be encoded/decoded through a bitstream. In this case, max_binary_depth_idx_minus1+1 may indicate the maximum depth in which the binary tree partitioning is allowed.

Figure 6:
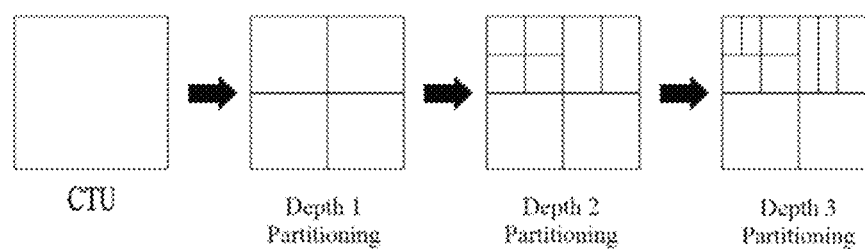
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth in which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary/triple tree partitioning is allowed, the depth in which the binary/triple tree partitioning is allowed, or the number of the depths in which the binary/triple tree partitioning is allowed may be obtained for each sequence or each slice. For example, the information may be encoded on the basis of a sequence, a picture, or a slice unit and transmitted through a bitstream. In contrast, a depth in which the binary/triple tree partitioning is allowed, or the number of the depths in which the binary/triple tree partitioning is allowed may be defined for each a sequence, a picture, or a slice unit. Accordingly, at least one of the number of the binary/triple tree partitioning in the first slice and the second slice, the maximum depth in which the binary/triple tree partitioning is allowed in the first slice and the second slice, or the number of depths in which the binary/triple tree partitioning is performed in the first slice and the second slice may be difference from a second slice. For example, in the first slice, binary tree partitioning may be allowed for only one depth, while in the second slice, binary tree partitioning may be allowed for two depths.

As another example, the number of times the binary/triple tree partitioning is allowed, the depth in which the binary/triple tree partitioning is allowed, or the number of depths in which the binary/triple tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into a plurality of second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into a plurality of third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of the horizontal direction or the vertical direction depending on a partitioning direction, and the partitioning direction may be determined based on the information on whether binary tree-based partitioning is performed in the vertical direction or the horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 301a may be determined as a leaf coding block, or may be further partitioned based on the quad tree or the binary tree.

In the meantime, the third coding block 301b partitioned based on the binary tree may be further partitioned into coding blocks 301b-2 of the vertical direction or coding blocks 301b-3 of the horizontal direction based on the binary tree, and the partition depth of the relevant coding blocks may be increased to k+3. Alternatively, the third coding block 301b may be determined as a leaf coding block 310b-1 that is no longer partitioned based on the binary tree. In this case, the coding block 301b-1 may be used as a prediction block or a transform block. However, the above partitioning process may be limitedly performed based on at least one of the information on a size/depth of the coding block that quad tree-based partitioning is allowed, the information on the size/depth of the coding block that binary tree-based partitioning is allowed, or the information on the size/depth of the coding block that binary tree-based partitioning is not allowed.

A number of a candidate that represent a size of a coding block may be limited to a predetermined number, or the size of the coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

Depending on whether the coding block is generated based on the quad tree partitioning, the binary tree partitioning, or the triple tree partitioning, it is possible to limit the application of the transform skip.

Here, when the inverse transform is skipped in both the horizontal direction and the vertical direction of the coding block, the inverse transform is not performed in the horizontal direction and the vertical direction of the coding block. In this case, an inverse quantized residual coefficient may be scaled to a preset value to obtain a residual sample of the coding block.

Omitting the inverse transform in the horizontal direction means performing the inverse transform using DCT, DST, or the like in the vertical direction, without performing the inverse transform in the horizontal direction. In this case, scaling may be performed in the horizontal direction.

Omitting the inverse transform in the vertical direction means performing the inverse transform using DCT, DST, or the like in the horizontal direction, without performing the inverse transform in the vertical direction. In this case, scaling may be performed in the vertical direction.

Specifically, according to a partitioning type of a coding block, it may be determined whether an inverse transform skip technique may be used for the coding block. For example, when the coding block is generated through binary tree-based partitioning, it may be limited to not use an inverse transform skip technique for the coding block. Accordingly, when the coding block is generated through binary tree-based partitioning, the residual sample of the coding block may be obtained by inversely transforming the coding block. In addition, when the coding block is generated through binary tree-based partitioning, encoding/decoding of information (e.g., transform_skip_flag) indicating whether an inverse transform is skipped may be omitted.

Alternatively, when the coding block is generated through binary tree-based partitioning, it may be limited to only allow an inverse transform skip technique in at least one of the horizontal direction or the vertical direction. Here, the direction in which the inverse transform skip technique is limited may be determined based on information decoded from the bitstream or adaptively determined based on at least one of a size of the coding block, a shape of the coding block, or an intra prediction mode of the coding block.

For example, when a coding block is a non-square block whose width is greater than the height, an inverse transform skip technique may be allowed only for the vertical direction, and the use of the inverse transform skip technique may be limited for the horizontal direction. That is, when the coding block is 2N×N, inverse transform may be performed in the horizontal direction of the coding block, and inverse transform may be selectively performed in the vertical direction.

On the other hand, when a coding block is a non-square block whose height is greater than the width, an inverse transform skip technique may be allowed only for the horizontal direction, and the use of the inverse transform skip technique may be limited for the vertical direction. That is, when the coding block is N×2N, inverse transform may be performed in the vertical direction of the coding block, and inverse transform may be selectively performed in the horizontal direction.

In contrast to the above example, when a coding block is a non-square block whose width greater than the height, an inverse transform skip technique is allowed only for the horizontal direction, when a coding block is a non-square block whose height is greater than the width, the inverse transform skip technique may be allowed only for the vertical direction.

Information on whether to skip inverse transform in the horizontal direction or information indicating whether to skip the inverse transform in the vertical direction may be signaled through the bitstream. For example, the information indicating whether to skip the inverse transform in the horizontal direction may be a 1-bit flag, 'hor_transform_skip_flag', and the information indicating whether to skip the inverse transform in the vertical direction may be a 1-bit flag, 'ver_transform_skip_flag'. The encoder may encode at least one of 'hor_transform_skip_flag' or 'ver_transform_skip_flag' according to a shape of the coding block. In addition, the decoder may determine whether inverse transform in the horizontal direction or the vertical direction is skipped using at least one of 'hor_transform_skip_flag' or 'ver_transform_skip_flag'.

Depending on a partitioning type of a coding block, in either direction, the inverse transform may be set to be omitted. For example, when the coding block is generated through binary tree-based partitioning, inverse transform in the horizontal direction or the vertical direction may be omitted. That is, if the coding block is generated by partitioning based on a binary tree, without encoding/decoding of information indicating whether the inverse transform of the coding block is skipped (for example, transform_skip_flag, hor_transform_skip_flag, ver_transform_skip_flag), it may be determined whether to skip the inverse transform in at least one of the horizontal or vertical direction with respect to the coding block.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
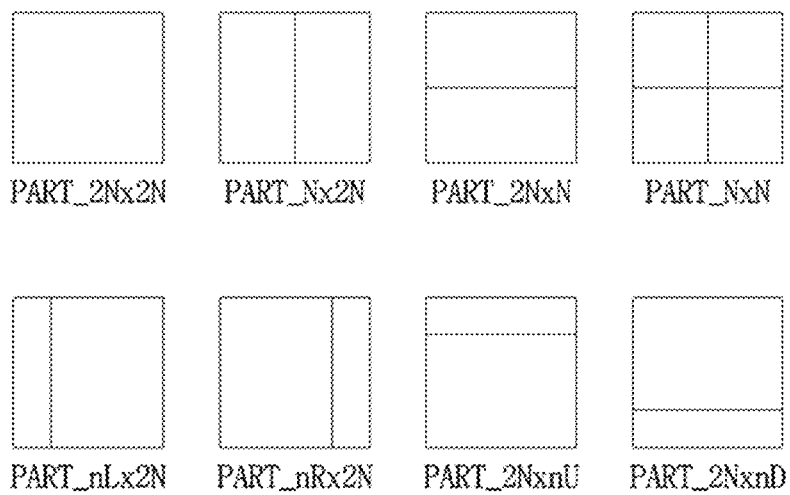
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
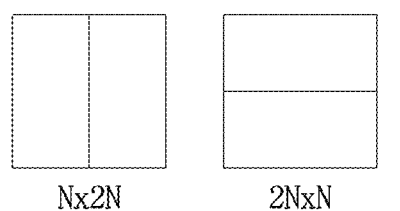
FIG. 4 is a diagram illustrating a partition type in which binary tree-based partitioning is allowed according to an embodiment of the present invention.
Figure 4:
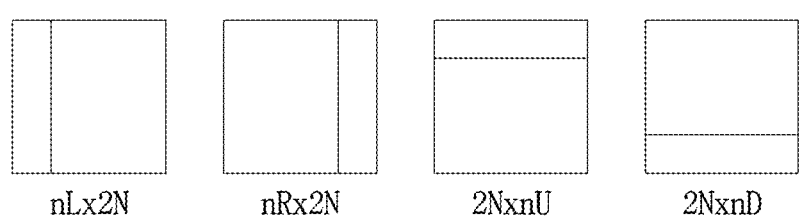

When a coding block is encoded by inter prediction, one of 8 partitioning modes may be applied to the coding block, as in the example shown in FIG. 4.

When a coding block is encoded by intra prediction, a partition mode PART 2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
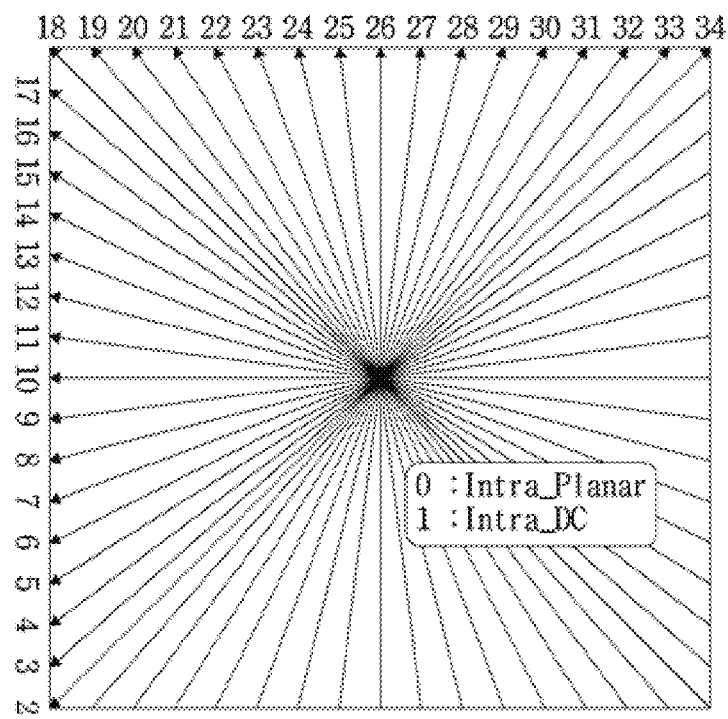
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

Specifically, a larger number of intra prediction modes than 35 intra prediction modes shown in FIG. 8 may be used. At this time, the use of a larger number of intra prediction modes than the 35 intra prediction modes may be referred to as an extended intra prediction mode.

Figure 9:
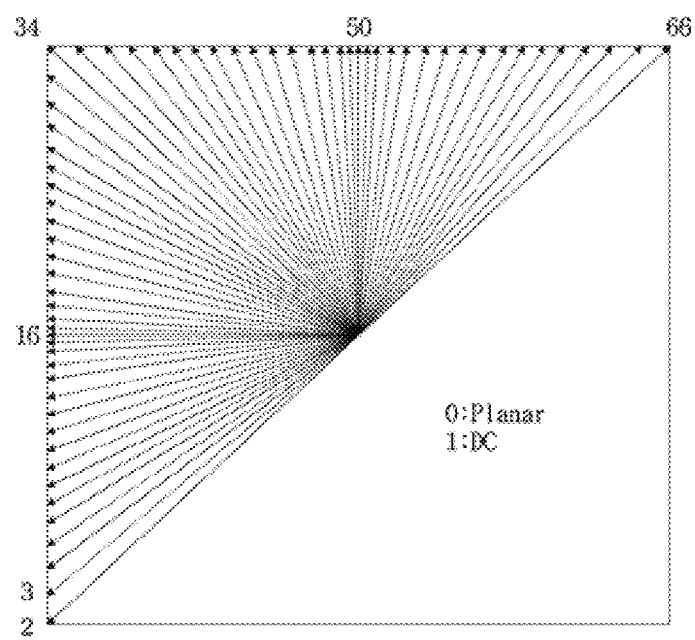
FIG. 9 is a diagram illustrating a kind of extended intra prediction modes according to an embodiment of the present invention.

FIG. 9 illustrates an example of extended intra prediction modes, and the extended intra prediction modes may include 2 non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on a size and/or shape of the block, a different number of intra prediction modes may be used to perform intra prediction. That is, depending on a size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through on the basis of a sequence, a picture, or a slice. For example, the information indicating a size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, or a size or a shape of a block. In addition, the number of intra prediction mode candidates (e.g., the number of MPMs) used for determining an intra prediction mode of a current block to be encoded/decoded may also be determined according to at least one of a color component, a color format, or a size or a shape of a block. In addition, it is also possible to use a larger number of intra prediction modes than shown in FIG. 8. For example, by further subdividing the directional prediction modes shown in FIG. 8, it is also possible to use 129 directional prediction modes and 2 non-directional prediction modes. Whether to use a larger number of intra prediction modes than shown in FIG. 8 may be determined in consideration of at least one of the color component, the color format component, the size or the shape of the block, as in the above-described example.

According to the directionality of an intra prediction mode, a directional intra prediction mode may be classified into a plurality of groups. For example, the first group may indicate intra prediction modes having a smaller value than the intra prediction mode in the horizontal direction as the directional intra prediction mode toward the bottom left direction. The first group of intra prediction modes may be referred to as a bottom horizontal intra prediction mode. For example, intra prediction modes smaller than 10 in 35 intra prediction modes or intra prediction modes having a mode value smaller than 16 in 67 intra prediction modes may be included in the first group.

The second group may indicate intra prediction modes having a mode value smaller than the intra prediction mode in the top left diagonal direction from the intra prediction mode in the horizontal direction. The second group of intra prediction modes may be referred to as the top horizontal intra prediction mode. For example, intra prediction modes having a mode value of 10 or more and less than 18 in 35 intra prediction modes or intra prediction modes having a mode value of 16 or more and less than 34 in intra prediction modes may be included in the second group.

The third group may indicate intra prediction modes having a mode value smaller than the intra prediction mode in the vertical direction from the intra prediction mode in the top left diagonal direction. The third group of intra prediction modes may be referred to as the left vertical intra prediction mode. For example, intra prediction modes having a mode value of 18 or more and less than 26 in 35 intra prediction modes or intra prediction modes having a mode value of 34 or more and less than 50 in 67 intra prediction modes may be included in the third group.

The fourth group may indicate intra prediction modes having a mode value same as or greater than the intra prediction mode in the vertical direction. For example, intra prediction modes having a mode value of 26 or more in 35 intra prediction modes or intra prediction modes having a mode value of 50 or more in 67 intra prediction modes may be included in the fourth group.

It is also possible to classify the directional intra prediction modes in more or less than the four groups, and it is also possible to set the range of intra prediction modes included in each of the four groups differently from the description.

Referring to the drawings to be described later, a method of determining an intra prediction mode of a current block to be encoded/decoded and a method of performing intra prediction using the determined intra prediction mode will be described with the drawings.

Figure 10:
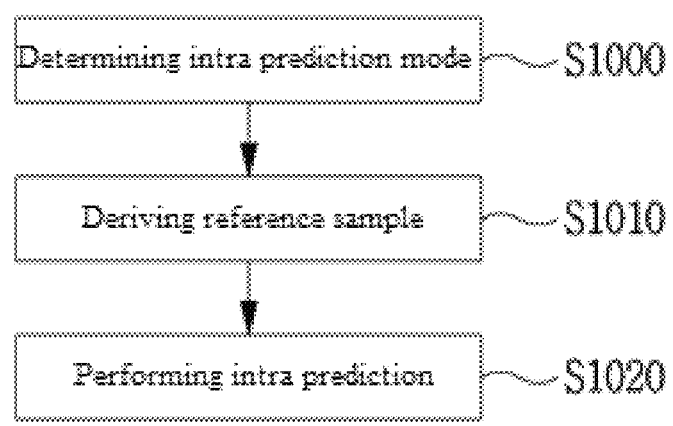
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of a current block may be determined at step S1000.

Specifically, the intra prediction mode of the current block may be derived based on a candidate list and an index. Here, the candidate list contains a plurality of candidates, and a plurality of candidates may be determined based on an intra prediction mode of the neighboring block adjacent to the current block. The neighboring block may include at least one of blocks positioned at the top, the bottom, the left, the right, or the corner of the current block. The index may specify one of a plurality of candidates in the candidate list. The candidate specified by the index may be set to the intra prediction mode of the current block.

An intra prediction mode used for intra prediction in a neighboring block may be set as a candidate. For example, candidates may be derived based on intra prediction modes of the left block, the top block, the bottom left corner neighboring block, the top right corner neighboring block, and the top left corner neighboring block of the current block. If the neighboring block is encoded by inter prediction, the candidate of the current block may be derived using the intra prediction mode of the collocated block of the neighboring block.

Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more, and the predetermined constant value may be adaptively determined according to the number of usable intra prediction modes. For example, when the number of usable intra prediction modes is 35, the predetermined constant value may be set to 1, and when the number of usable intra prediction modes is 67, the predetermined constant value may be set to 2. Furthermore, when the number of usable intra prediction modes is 131, the predetermined constant value may be set to 4.

The candidate list may further include a default mode. The default mode may include at least one of a planar mode, a DC mode, the vertical mode, the horizontal mode, top right diagonal mode, or top left diagonal mode. The default mode may be adaptively added considering the maximum number of candidates that can be included in the candidate list of the current block.

The maximum number of candidates that can be included in the candidate list may be three, four, five, six, seven or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, a color type, a color format, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, or a block level.

Candidates included in the candidate list may be sorted in a predefined order. For example, candidates may be arranged in the candidate list in the order of the left block, the top block, the bottom left block, the top right block, and the top left block. Alternatively, the order of candidates may be variably determined according to a size or shape of the current block. For example, when the current block is a non-square block whose height is greater than the width, the intra prediction mode of the top block may be arranged with a higher priority than the intra prediction mode of the left block.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (the horizontal mode), it may be transformed into an index of 16 corresponding to the horizontal mode in the extended intra prediction modes.

Alternatively, when the top neighboring block uses the extended intra prediction modes and the intra prediction mode the top neighboring block has an index of 50 (the vertical mode), it may be transformed into an index of 26 corresponding to the vertical mode in the 35 intra prediction modes.

Based on the above-described method of determining the intra prediction mode, the intra prediction mode may be derived independently for each of a luma component and a chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode | IntraPredModeY [xCb] [yCb] | | | | |
|---|---|---|---|---|---|
| [xCb] [yCb] | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 10, a reference sample for intra prediction of the current block may be derived at step S1010.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to a plurality of neighboring samples positioned on the same horizontal line or the second intra filter applied to a plurality of neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

The filtering may be adaptively performed based on at least one of the intra prediction mode of the current block or a size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than the threshold, filtering may be performed. The threshold may be defined for each size of the transform block as shown in Table 2.

TABLE 2

|  | 8 × 8 transform | 16 × 16 transform | 32 × 32 transform |
|---|---|---|---|
| Threshold | 7 | 1 | 0 |

The intra filter may be determined as one of a plurality of intra filter candidates pre-defined in the device for encoding/decoding a video. To this end, a separate index specifying an intra filter of the current block among a plurality of intra filter candidates may be signaled. Alternatively, the intra filter may be determined based on at least one of a size/shape of the current block, a size/shape of the transform block, the information about the filter strength, or the variation of surrounding samples.

The intra prediction on a current coding block may be performed by using a plurality of reference sample lines. For example, it may be performed by using two or more reference sample lines.

Whether to perform an intra prediction using a plurality of reference sample lines may be determined based on a size/shape of the current block, an intra prediction mode, or the like. For example, when an intra prediction mode of a current block is a non-directional intra prediction mode or an intra prediction mode in a specific direction, performing the intra prediction using a plurality of reference sample lines may be limited. Herein, the specific direction may include the vertical direction, the horizontal direction, or the diagonal direction.

Referring to FIG. 10, intra prediction may be performed using the intra prediction mode of the current block and the reference sample at step S1020.

That is, the prediction sample of the current block may be obtained using the intra prediction mode determined at step S1000 and the reference sample derived at step S1010. When intra prediction is performed using a plurality of reference sample lines, a prediction sample may be obtained based on a weighted sum of reference samples belonging to different reference sample lines. For example, the prediction sample may be derived based on a weighted sum of the first reference sample belonging to the first reference sample line and the second reference sample belonging to the second reference sample line. In this case, the weights applied to the first reference sample and the second reference sample may have the same value or may have different values depending on the distance from the prediction target sample. For example, a higher weight may be given to a reference sample that is close to the prediction target sample among the first reference sample and the second reference sample.

However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIG. 11. However, the correction process is not limited to being applied only to the intra prediction sample, and may be applied to an inter prediction sample or the reconstructed sample.

Figure 11:
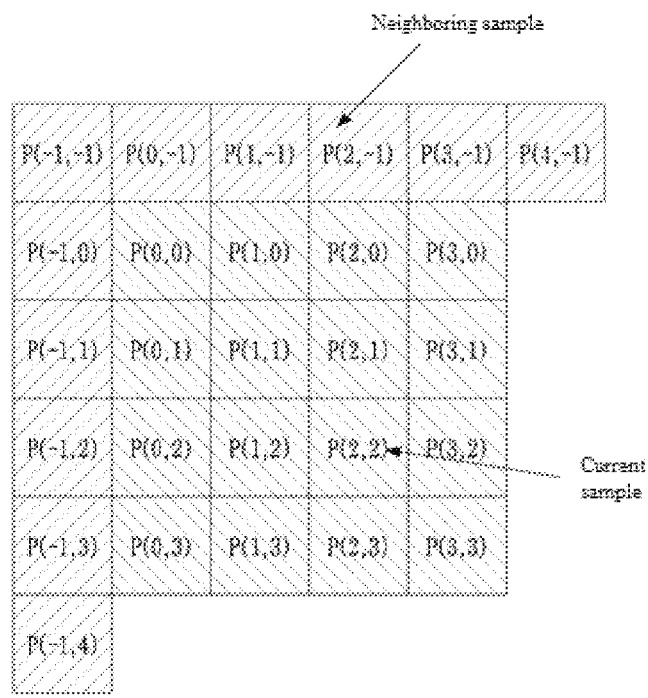
FIG. 11 is a diagram illustrating a method of correcting a prediction sample of a current block based on differential information of neighboring samples according to an embodiment of the present invention.

FIG. 11 is a diagram illustrating a method of correcting a prediction sample of a current block based on differential information of neighboring samples according to an embodiment of the present invention.

The prediction sample of the current block may be corrected based on the differential information of a plurality of neighboring samples for the current block. The correction may be performed on all prediction samples in the current block, or may be performed on prediction samples in pre-determined partial regions. The partial regions may be one row/column or a plurality of rows/columns, and these may be preset regions for correction in the device for encoding/decoding a video. For example, correction may be performed on a one row/column located at a boundary of the current block or may be performed on a plurality of rows/columns from the boundary of the current block. Alternatively, the partial regions may be variably determined based on at least one of a size/shape of the current block or an intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, or the like.). Here, the predetermined constant value may be determined considering the position of the prediction sample which is the correction target, the position of a column or a row including the prediction sample which is the correction target, the position of the prediction sample within the column, the row, or the like.

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad \text{[Equation 1]}$$

For example, when the intra prediction mode of the current block is the horizontal mode, differential samples between the top left neighboring sample $p(-1, -1)$ and neighboring samples $p(x, -1)$ adjacent to the top boundary of the current block may be used to obtain the final prediction sample as shown in Equation 1

$$P'(x,0)=p(x,0)+((p(x,-1)-p(-1,-1))>>1 \text{ for } x=0 \ldots N-1 \quad \text{[Equation 2]}$$

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample as shown in Equation 2. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))\gg 1 \text{ for } y=0 \ldots N-1 \quad [\text{Equation 3}]$$

$$P'(1,y)=P(1,y)+((p(-1,y)-p(-1,-1))\gg 2 \text{ for } y=0 \ldots N-1 \quad [\text{Equation 4}]$$

For example, when the intra prediction mode of the current block is the horizontal mode, differential samples between the top left neighboring sample p(−1, −1) and neighboring samples p(x, −1) adjacent to the left boundary of the current block may be used to obtain the final prediction sample. This is as described above in the horizontal mode. For example, the prediction samples may be corrected as in Equations 5 and 6 below.

$$P(x,0)=p(x,0)+((p(x,-1)-p(-1,-1))\gg 1 \text{ for } x=0 \ldots N-1 \quad [\text{Equation 5}]$$

$$P'(x,1)=p(x,1)+((p(x,-1)-p(-1,-1))\gg 2 \text{ for } x=0 \ldots N-1 \quad [\text{Equation 6}]$$

When an intra prediction mode of a current block is a directional prediction mode, intra prediction of the current block may be performed based on the directionality of the directional prediction mode. For example, Table 3 shows an intra direction parameter intraPredAng from Mode 2 to Mode 34, which is the directional intra prediction mode illustrated in FIG. 8.

Depending on a directionality of an intra prediction mode, reference samples of the current block may be arranged in one dimension. Specifically, when both the top reference sample and the left reference sample should be used for intra prediction of the current block, it is assumed that they are arranged in a line along the vertical or horizontal direction, and reference samples of each prediction target sample may be selected.

For example, in the case where the intra direction parameter is negative (eg, the intra prediction mode corresponding to Mode 11 to Mode 25 in Table 3), the top reference samples and the left reference samples may be rearranged along the horizontal or vertical direction to form a one-dimensional reference sample group P_ref_1D.

Figure 12:
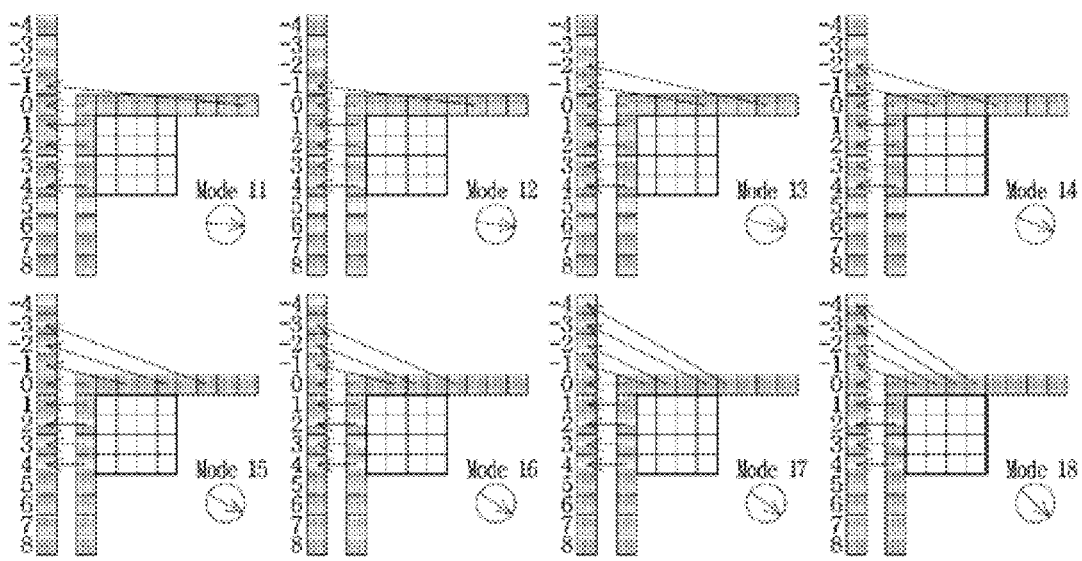
FIGS. 12 and 13 are a diagram illustrating a one-dimensional reference sample group in which reference samples are rearranged in a line.
Figure 13:
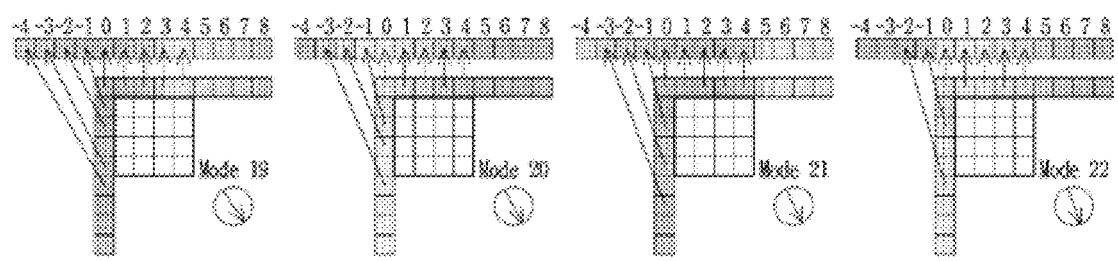
Figure 13:
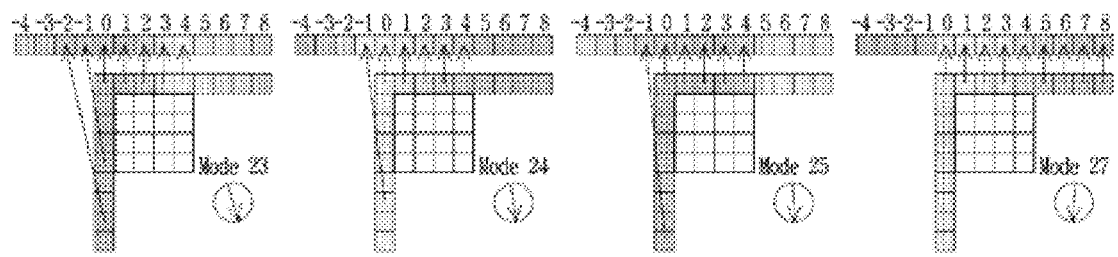

FIGS. 12 and 13 are a diagram illustrating a one-dimensional reference sample group in which reference samples are rearranged in a line.

Whether to rearrange the reference samples in the vertical direction or in the horizontal direction may be determined according to a directionality of an intra prediction mode. For example, if the intra prediction mode index is between 11 and 18, as in the example shown in FIG. 12, the top reference samples of a current block can be rotated counterclockwise to generate a one-dimensional reference sample group in which the left reference samples and the top reference samples are arranged in the vertical direction.

On the other hand, if the intra prediction mode index is between 19 and 25, as in the example shown in FIG. 13, the left reference samples of the current block may be rotated clockwise to generate a one-dimensional reference sample group in which the left reference samples and the top reference samples are arranged in the horizontal direction.

If the intra direction parameter of the current block is not negative, intra prediction for the current block may be

TABLE 3

| | Pred Mode Intra | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| intra Pred Ang | — | 32 | 26 | 21 | 17 | 13 | 9 | 5 | 2 | 0 | −2 | −5 | −9 | −13 | −17 | −21 |
| | Pred Mode Intra | | | | | | | | | | | | | | | |
| | 18 | 19 | 20 | 21 | 22 | 23 | 24 | 25 | 26 | 27 | 28 | 29 | 30 | 31 | 32 | 33 |
| intra Pred Ang | −32 | −26 | −21 | −17 | −13 | −9 | −5 | −2 | 0 | 2 | 5 | 9 | 13 | 17 | 21 | 26 |

In Table 3, 33 directional intra prediction modes have been described by way of example, but more or fewer directional intra prediction modes may be defined.

An intra direction parameter for a current block may be determined based on a lookup table that defines a mapping relationship between a directional intra prediction mode and an intra direction parameter. Alternatively, the intra direction parameter for the current block may be determined based on the information signaled through the bitstream.

Intra prediction of the current block may be performed using at least one of the left reference sample or the top reference sample, depending on the directionality of the directional intra prediction mode. Here, the top reference sample may be a reference sample (eg, (−1, −1) to (2W−1, −1)) having a y-axis coordinate smaller than the prediction target sample (x, 0) included in the top row in the current block, and the left reference sample may be a reference sample (eg, (−1, −1) to (−1, 2H−1)) having x-axis coordinates smaller than the prediction target sample (0, y) included in the leftmost column in the current block.

performed using only the left reference samples or the top reference samples. Accordingly, for the intra prediction modes in which the intra direction parameter is not negative, the one-dimensional reference sample group may be generated using only the left reference sample or the top reference samples.

Based on the intra direction parameter, a reference sample determination index iIdx for specifying at least one reference sample used to predict the prediction target sample may be derived. In addition, a weight related parameter ifact used to determine a weight applied to each reference sample based on the intra direction parameter may be derived. For example, Equations 7 and 8 illustrate examples of deriving reference sample determination index and weight related parameter $$iIdx=(y+1)*(P_{ang}/32)$$

$$i\text{fact}=[(y+1)*P_{ang}]31 \quad [\text{Equation 7}]$$

As shown in Equation 7, iIdx and ifact are variably determined according to the slope of the directional intra prediction mode. In this case, the reference sample specified by iIdx may correspond to an integer pel.

Based on a reference sample determination index, at least one reference sample may be specified for each prediction sample. For example, the position of the reference sample in the one-dimensional reference sample group for predicting the prediction target sample in the current block may be specified based on the reference sample determination index. Based on the reference sample at the specified position, a prediction image (ie, a prediction sample) for the prediction target sample may be generated.

Considering an intra prediction mode of a current block, if a prediction target sample can be predicted with only one reference sample, the prediction image of the prediction target sample may be generated based on the reference sample specified by the intra prediction mode of the current block.

For example, when an imaginary angular line according to the angle or the slope of the intra prediction mode crosses an integer pel (i.e., a reference sample at an integer position) the one-dimensional reference sample group, by copying the reference sample at the integer pel position or considering the position between the reference sample at the integer pel position and the prediction target sample, the prediction image of the prediction target sample may be generated. For example, the following Equation 8 illustrates an example of generating the prediction image P(x, y) for the prediction target sample by copying the reference sample P_ref_1D(x+iIdx+1) in the one-dimensional reference sample group specified by the intra prediction mode of the current block.

$$P(x,y) = P\_ref\_1D(x+iIdx+1) \qquad \text{[Equation 8]}$$

In consideration of an intra prediction mode of a current block, when it is determined that a prediction target sample is not predicted with only one reference sample, a plurality of reference samples may be used to perform prediction on the prediction target sample. Specifically, according to the intra prediction mode of the current block, the prediction target sample may be predicted by performing linear interpolation or tap filter based interpolation on the reference sample at a predetermined position and neighboring reference samples neighboring the reference sample at a predetermined position. The number of taps of the interpolation filter may be two or more natural numbers. Specifically, the number of taps of the tap filter may be an integer of 2, 3, 4, 5, 6, or more, depending on the number of reference samples to be interpolated.

For example, an imaginary angular line according to the angle of the intra prediction mode or the slope of the intra prediction mode does not cross the integer pel (ie, the reference sample at the integer position) in the one-dimensional reference sample group, a prediction image of a prediction target sample may be generated by interpolating a reference sample placed on a corresponding angle line and a reference sample adjacent to the left/right or up/down of the reference sample. For example, the following Equation 9 illustrates an example of generating a prediction sample P(x, y) for a prediction target sample by interpolating two or more reference samples.

$$P(x,y) = (32-i_{fact})/32 * P\_ref\_1D(x+iIdx+1) + i_{fact}32 * P\_ref\_1D(x+iIdx+2) \qquad \text{[Equation 9]}$$

A coefficient of an interpolation filter may be determined based on a weight related parameter $i_{fact}$. As an example, the coefficient of the interpolation filter may be determined based on the distance between the fractional pel and the integer pel (i.e., the integer position of each reference sample) located on an angular line.

The following Equation 10 illustrates a case where a tap number of a tap filter is 4.

$$P(x,y)f(0)*P\_ref\_1D(x+iIdx-1)+f(1)*P\_ref\_1D(x+iIdx)+f(2)*P\_ref\_1D(x+iIdx+1)+f(3\_*P\_ref\_1D(x+iIdx-2) \qquad \text{[Equation 10]}$$

When using a multi-tap filter, a sample at a position that does not correspond to the left reference sample or the top reference sample may be replaced with the nearest reference sample at that position. As an example, in Equation 9, when a sample at the position P_ref_1D (x+iIdx−1) does not correspond to the top reference sample, the sample may be replaced with a reference sample at the position P_ref_1D (x+idx). Alternatively, when a sample at the P_ref_1D(x+iIdx+2) position does not correspond to the top reference sample, the sample may be replaced with a reference sample at the P_ref_1D (x+iIdx+1) position.

The multi-tap filter can be applied to a plurality of reference samples arranged in a line along the horizontal or vertical direction. Alternatively, the multi-tap filter may be applied to a predetermined polygonal shape such as a rectangle. A shape to which the multi-tap filter is applied may be variably determined according to the size, shape, or intra prediction mode of the current block.

As shown in Equations 8 to 10, generating a prediction sample by interpolating a reference sample using the directionality of intra prediction may be referred to as an intra prediction sample interpolation technique.

In using the intra prediction sample interpolation technique, a large tap number of tap filters does not necessarily guarantee an improvement in prediction accuracy. For example, when a size of the current block is an asymmetric coding unit that one of the height or width is significantly larger than the other, such as 2×16, or a block of small size, such as 4×4, using a tap filter of 4 taps or more may result in excessive smoothing of the prediction image. Accordingly, a type of tap filter may be adaptively determined according to a size, shape, or intra prediction mode of the current block. Here, a type of tap filter may be classified by at least one of a number of taps, filter coefficients, filter strength (strong/weak), or filtering direction. The number of filter taps or the filter coefficient may be variably determined according to the filter strength. In addition, depending on the type of the tap filter, an application direction of the tap filter, such as horizontal interpolation, vertical interpolation, or horizontal and vertical interpolation, may be determined. The application direction of the tap filter may be variably set on the basis of lines (rows or columns) or samples in the current block.

Specifically, the type of tap filter to be used may be determined based on the width or height of a current block. As an example, when at least one of the width or height of the current block is smaller than a predefined value, an intra prediction sample interpolation technique may be performed by using a 2-tap filter instead of a 4-tap filter. On the other hand, when both the width and height of the current block is greater than or equal to the predetermined value, the intra prediction sample interpolation technique may be performed using the 4-tap filter. Here, the predefined value may represent a value such as 4, 8, or 16.

Alternatively, the type of tap filter to be used may be determined according to whether the width and height of the current block are the same. For example, when the width and height of the current block are different values, the intra prediction sample interpolation technique may be performed using the 2-tap filter instead of the 4-tap filter. On the other hand, when the width and height of the current block have the same value, the intra prediction sample interpolation technique may be performed using the 4-tap filter.

Alternatively, the type of tap filter to be used may be determined according to the ratio of the width and the height of the current block. For example, when the ratio of the width (w) to the height (h) of the current block (ie, w/h or h/w) is less than a predefined threshold, the intra prediction sample interpolation technique may be performed using the 2-tap filter instead of the 4-tap filter On the other hand, when the ratio of the width and height of the current block is greater than or equal to the predefined threshold value, the intra prediction sample interpolation technique may be performed using the 4-tap filter.

Alternatively, the type of tap filter may be determined according to an intra prediction mode, a shape, or a size of the current block. For example, when the current block is a 2×16 type coding unit and the intra prediction mode of the current block is an intra prediction mode belonging to the horizontal range, the intra prediction sample interpolation technique may be performed using a tap filter having a tap number n. On the other hand, when the current block is a 2×16 type coding unit and the intra prediction mode of the current block is an intra prediction mode belonging to the vertical direction range, the intra prediction sample interpolation technique may be performed using a tap filter having a tap number m.

On the other hand, when the current block is a 16×2 type coding unit and the intra prediction mode of the current block is the intra prediction mode belonging to the horizontal direction range, the intra prediction sample interpolation technique may be performed using a tap filter having a tap number n. On the other hand, when the current block is a 16×2 type coding unit and the intra prediction mode of the current block is the intra prediction mode belonging to the vertical direction range, the intra prediction sample interpolation technique may be performed using a tap filter having a tap number m.

Here, the horizontal range may indicate a predetermined range including the intra prediction mode in the horizontal direction, and the vertical range may indicate a predetermined range including the intra prediction mode in the vertical direction. For example, based on 35 intra prediction modes, the horizontal direction range may indicate an intra prediction mode between modes 11 and 18, and the vertical direction range may indicate an intra prediction mode between modes 19 and 27.

In addition, n and m are constants greater than 0, and n and m may have different values. Alternatively, n and m may be set to have the same value, but at least one of filter coefficients or filter intensities of the n tap filter and the m tap filter may be set differently.

One block may be partitioned into a plurality of sub-blocks, and intra prediction may be performed in a unit of a sub-block. In this case, sub-blocks belonging to one block may have the same intra prediction mode. However, the range of reference samples to which each sub-block refers may be different. That is, in the example shown in FIG. 10, the reference sample deriving step S1010 and the intra prediction performing step S1020 may be performed in a unit of a sub-block.

A block including a plurality of sub-blocks may be a coding block, a prediction block, or a transform block. Alternatively, a block including a plurality of sub-blocks may be a predetermined region sharing the same intra prediction mode and the same MPM candidate list.

A size and shape of a block (or region) including a plurality of sub-blocks may have an N×M shape predefined in an encoder and a decoder. Here, N and M, as natural numbers, may be the same or may be different from each other.

Alternatively, information for specifying a size and shape of a block (or region) including a plurality of sub-blocks may be signaled through the bitstream. The size and shape of a block (or region) including a plurality of sub-blocks may be variably determined based on the signaled information.

For convenience of description, an intra prediction target block (or region) including a plurality of sub-blocks will be referred to as a current block. Hereinafter, a method of performing intra prediction in a unit of a sub-block will be described in detail.

Figure 14:
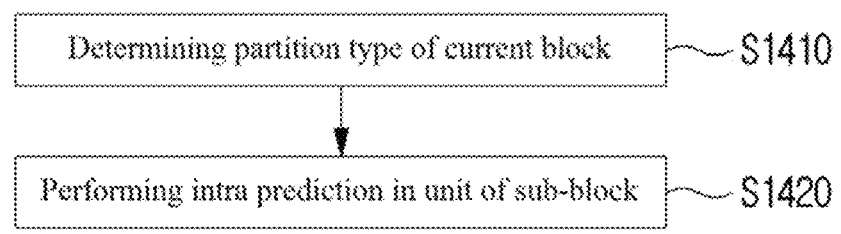
FIG. 14 is a flowchart illustrating a method of performing intra prediction on the basis of a sub-block.

FIG. 14 is a flowchart illustrating a method of performing intra prediction on the basis of a sub-block.

Referring to FIG. 14, first, a partition type of a current block may be determined S1410.

A partition type of the current block may be determined based on at least one of a size, shape, or intra prediction mode of the current block. For example, when the intra prediction mode of the current block is the vertical direction or similar to the vertical direction, a partition type of the current block may have a form in which sub-blocks are arranged up and down. On the other hand, when the intra prediction mode of the current block is the horizontal direction or similar to the horizontal direction, a partition type of the current block may have a form in which sub-blocks are arranged left and right. Here, the intra prediction mode similar to the specific direction may be an intra prediction mode whose angle is within a predetermined angle from the specific direction or whose mode value difference from the intra prediction mode in the specific direction is within a predetermined value.

Figure 15:
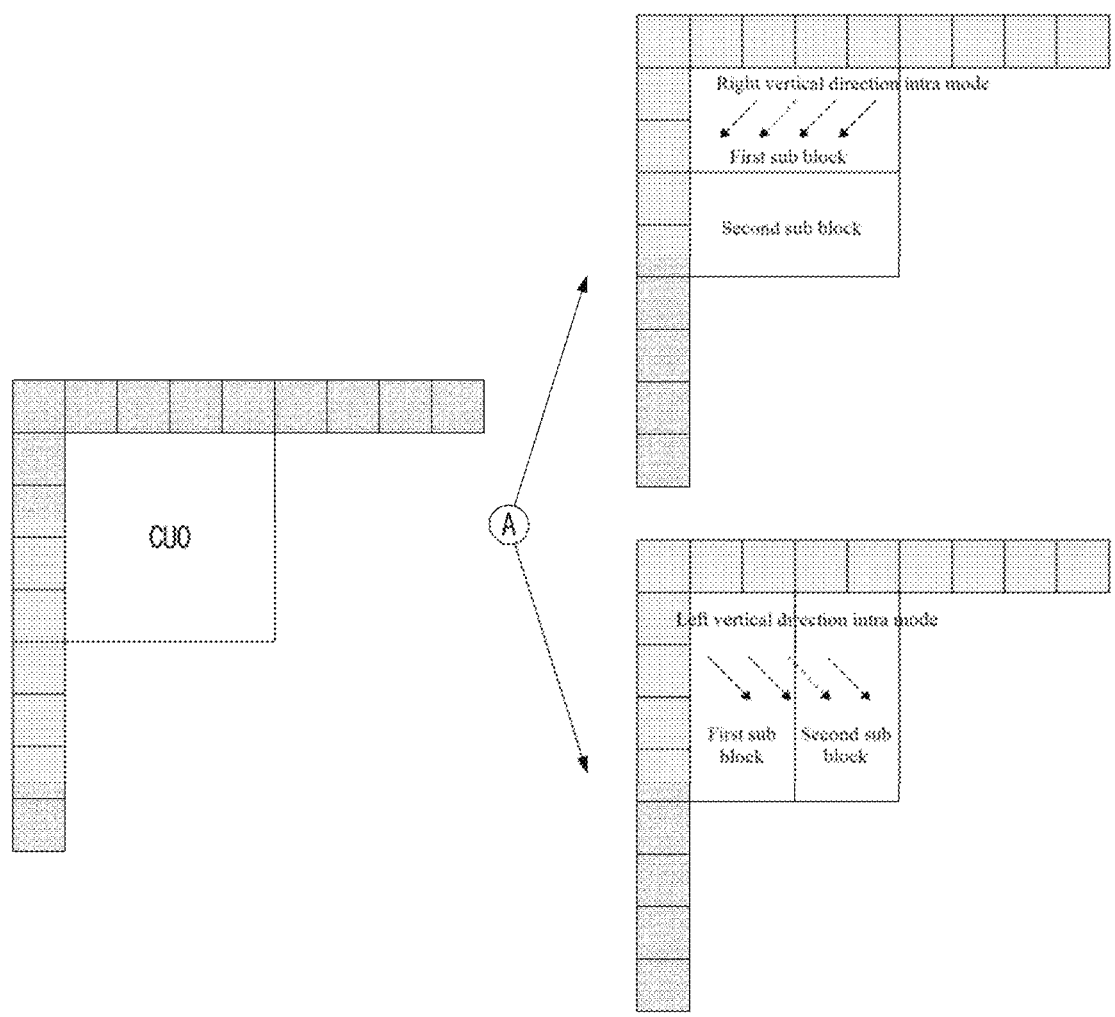
FIG. 15 is a diagram illustrating a partitioning type of a sub-block according to an intra prediction mode.

FIG. 15 is a diagram illustrating a partition type of a sub-block according to an intra prediction mode.

As in the example shown in FIG. 15, when a current block has an intra prediction mode in the top right direction, the current block may be partitioned into sub-blocks having a width longer than the height (N×M shape, where N>M). On the other hand, when the current block has an intra prediction mode in the top left direction, the current block may be partitioned into sub-blocks having a height longer than the width (N×M shape, where N<M).

As another example, depending on whether the intra prediction mode of the current block has a specific direction, a partition type of the coding block may be determined. For example, when the current block has an intra prediction mode in the top right direction, the partition type of the current block may be determined as sub-blocks arranged up and down. On the other hand, when the current block has an intra prediction mode other than that, the partition type of the current block may be determined as sub-blocks arranged to the left and right.

Alternatively, information indicating the partition type of the current block may be signaled through the bitstream. In this case, the information indicating the partition type may include at least one of an index for specifying the partition type, information indicating a size and shape of the sub-block, or information indicating the partitioning direction of the current block.

The sub-block may be square or non-square. Alternatively, it is also possible to generate the sub-block by partitioning the current block on the basis of a row or column or by partitioning the current block on the basis of a plurality of rows or columns.

When a plurality of sub-blocks are generated by partitioning the current block, intra prediction may be performed on the basis of a sub-block (S1420). In this case, the intra prediction may be sequentially performed according to a position of the sub-block.

Figure 16:
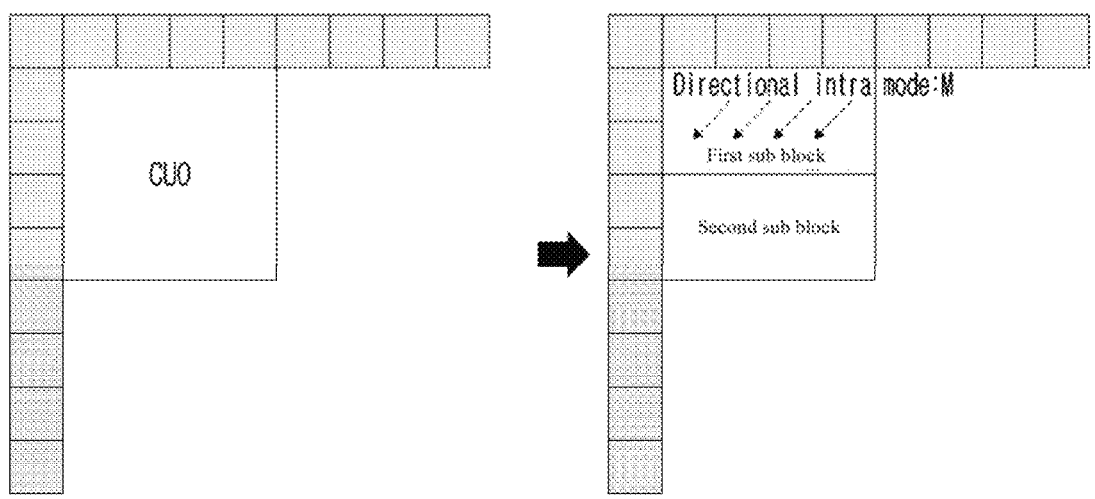
FIGS. 16 and 17 are a diagram illustrating an example of performing intra prediction on the basis of a sub-block.
Figure 17:
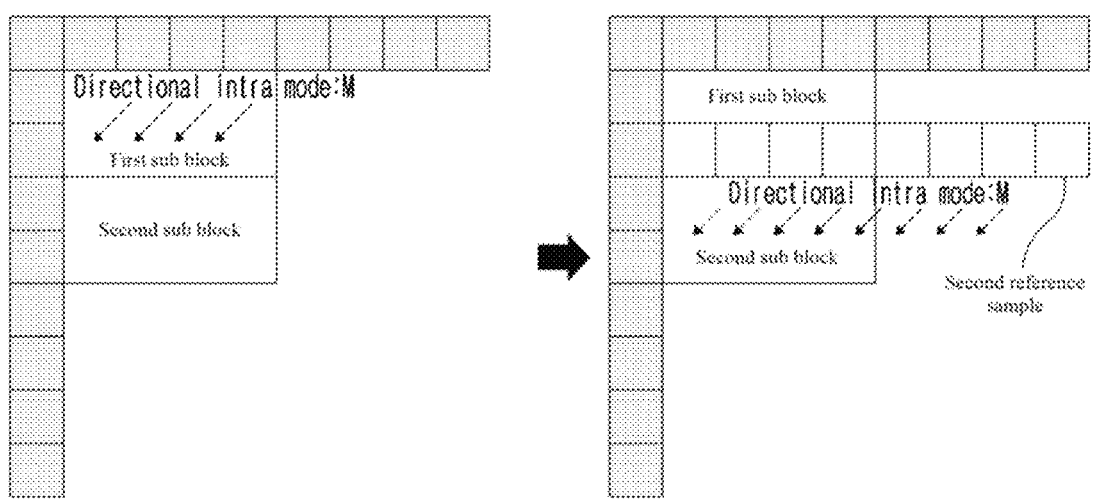

FIGS. 16 and 17 are a diagram illustrating an example of performing intra prediction on the basis of a sub-block.

In order to perform intra prediction on the basis of a sub-block, one block may be partitioned into a plurality of sub-blocks. Even though it is illustrated in the example shown in FIGS. 16 and 17 that the coding block is partitioned into two sub-blocks, it is also possible to partition the coding block into a larger number of sub-blocks.

A plurality of sub-blocks may have the same intra prediction mode. For example, an intra prediction mode of the first sub-block and an intra prediction mode of the second sub-block may both be an intra prediction mode in the top right direction.

Intra prediction of the first sub-block adjacent to the top boundary or the left boundary of a current block among a plurality of sub-blocks may be performed using a reference sample adjacent to the coding block. As an example, intra prediction on the first sub-block may be performed using at least one of the top reference sample or the left reference sample adjacent to the coding block according to the intra prediction mode.

After performing intra prediction of the first sub-block, intra prediction of the second sub-block adjacent to the first sub-block may be performed by setting a sample included in the first sub-block as a reference sample. For example, a sample located at the bottom boundary of the first sub-block adjacent to the second sub-block may be set as a reference sample for intra prediction of the second sub-block. In this case, a sample of the first sub-block may be a prediction sample, a residual sample, or a reconstructed sample reconstructed by using the prediction sample and the residual sample for the first sub-block.

As an example, in the example illustrated in FIG. 17, neighboring samples adjacent to the top of the second sub-block are illustrated as being set as reference samples (denoted as 'the second reference sample' in FIG. 17) for the second sub-block.

Alternatively, the intra prediction of the second sub-block may include the first intra prediction using a reference sample adjacent to the current block and the second intra prediction using a reference sample in the first sub-block. For example, a prediction sample in the second sub-block may be derived based on a weighted sum between the first prediction sample generated based on the first intra prediction and the second prediction sample generated based on the second intra prediction. In this case, a weight applied to the first prediction sample and the second prediction sample may have the same value or may be set differently according to the distance from a prediction target sample.

A residual sample of a current block on which intra prediction is performed may be obtained through inverse quantization and inverse transform. In this case, when a plurality of transforms are applied to the current block, a unit to which the transform is applied may be variably determined according to a transform order. For example, the first transform may be performed on the basis of the coding block, while the second transform may be performed on the basis of a sub-block. In this case, a reference sample of the second sub-block may be configured by using a sample (ie, a residual sample) to which the second transform is applied in the first sub-block. For example, a reference sample of the second sub-block may be derived as the sum of a prediction sample and the residual sample in the first sub-block.

Depending on an intra prediction mode, a case where a sample of a location that is not predicted or reconstructed should be used as a reference sample may occur. For example, in the example shown in FIG. 17, a sample adjacent to the top right corner of the second sub-block and samples located to the right from the sample are likely to be samples that have not yet been predicted or reconstructed. In this case, the sample that is not predicted or reconstructed may be replaced with a sample located at the right boundary of the first sub-block or an interpolated value of a predetermined number of samples included in the first sub-block.

When the first sub prediction block is generated through intra prediction on the first sub-block and the second sub prediction block is generated through intra prediction on the second sub-block, a prediction block of a current block may be generated by merging the first sub prediction block and the second sub prediction block.

Whether to perform intra prediction of a current block on the basis of a sub-block may be adaptively determined according to a size, shape, or intra prediction mode of the current block. For example, it may be determined whether intra prediction of the current block is performed on the basis of a sub-block according to whether the intra prediction mode of the current block is a directional mode in a specific direction.

Alternatively, information indicating whether to perform intra prediction of the current block on the basis of a sub-block may be encoded and signaled through a bitstream. The information may be signaled on the basis of a block or signaled on the basis of a slice or picture.

In the above-described embodiment, it is assumed that one intra prediction mode is applied to a current block. However, intra prediction may be performed on the current block by using a plurality of intra prediction modes. Here, a plurality of intra prediction modes may be represented by a combination of a non-directional intra prediction mode and at least one directional intra prediction mode, a combination of a plurality of directional intra prediction modes, or a combination of a plurality of non-directional intra prediction modes.

For example, different intra prediction modes or different directional intra prediction modes may be applied to each prediction target sample in a current block. In order to determine an intra prediction mode of each prediction target sample, information indicating an intra prediction mode difference value with a previous prediction target sample may be signaled through the bitstream.

For example, a current block may be partitioned into a plurality of regions, and different intra prediction modes may be applied to the partitioned regions. Here, a plurality of regions may represent a predetermined number of sample units and a predetermined size/shape of a block unit. For example, the current block may be partitioned into a plurality of sub-blocks having a predetermined shape/size. Alternatively, a plurality of regions may be generated by partitioning the current block into predetermined row/column units. For example, a region including a row/column on the boundary of both sides of the current block is set as the first region, and other area is set as the second area, so that different intra prediction modes may be applied to the first region and the second region. A number of regions may be variably determined according to a size of a current prediction block, a number of samples, or the like, or may have a fixed number predefined in the encoder and the decoder regardless of these elements.

Although the above-described embodiments are described based on a series of steps or flowcharts, this does not limit the time-series order of the invention and may be performed simultaneously or in a different order as necessary. In addition, in the above-described embodiment, each component (e.g., a unit, a module, or the like.) constituting the block diagram may be implemented as a hardware device or software, and a plurality of components may be combined to be implemented as one hardware device or software. The above-described embodiments may be implemented in the form of program instructions that may be executed by various computer components, and may be recorded in a computer-readable recording medium. The computer-readable recording medium may include a program instruction, a data file, a data structure, etc. alone or in combination. Examples of computer-readable recording media include magnetic media such as a hard disk, a floppy disk and a magnetic tape, an optical recording media such as a CD-ROM, a DVD, and a magneto-optical media such as a floptical disk, and hardware devices specifically configured to store and execute a program instruction, such as a ROM, a RAM, a flash memory, and the like. The hardware device may be configured to operate as one or more software modules to perform the process according to the invention, and vice versa.

INDUSTRIAL APPLICABILITY

The present invention can be applied to an electronic device capable of encoding/decoding an image.

The invention claimed is:

1. A method for decoding a video, the method comprising:
determining a partition type of a current coding block;
determining an intra prediction mode of the current coding block;
generating a prediction block based on the intra prediction mode of the current coding block;
generating a residual block by selectively performing inverse-transform, whether to perform the inverse-transform being determined based on a transform skip flag; and
generating a reconstructed block based on the prediction block and the residual block,
wherein, when the partition type of the current coding block is horizontal partitioning or vertical partitioning, the current coding block is divided into a plurality of sub-blocks and intra prediction is performed for each of the sub-blocks,
wherein a number of the sub-blocks generated by dividing the current coding block is adaptively determined as 2 or more depending on a size of the current coding block, and
wherein, when the partition type of the current coding block is the horizontal partitioning or the vertical partitioning, the transform skip flag is not decoded from a bitstream, and it is determined that the inverse-transform is not skipped.

2. The decoding method of claim 1,
wherein the partition type of the current coding block is determined based on a syntax element signaled via a bitstream.

3. The decoding method of claim 1,
wherein determination of whether it is allowed to divide the current block into the plurality of sub-blocks is determined based on a size of the current coding block.

4. A method for encoding a video, the method comprising:
determining a partition type of a current coding block;
determining an intra prediction mode of the current coding block;
generating a prediction block based on the intra prediction mode of the current coding block;
generating a residual block by subtracting the prediction block from an original block; and
generating residual coefficients by selectively performing a transform for the residual block,
wherein, when the partition type of the current coding block is horizontal partitioning or vertical partitioning, the current coding block is divided into a plurality of sub-blocks and intra prediction is performed for each of the sub-blocks,
wherein a number of the sub-blocks generated by dividing the current coding block is adaptively determined to 2 or more
depending on a size of the current coding block, and
wherein when the partition type of the current coding block is the horizontal partitioning or the vertical partitioning, encoding of a transform skip flag specifying whether the transform has been skipped or not is omitted and it is determined that the transform is not skipped.

5. The encoding method of claim 4,
wherein a syntax element specifying the partition type of the current coding block is encoded in a bitstream.

6. The encoding method of claim 4,
wherein determination of whether it is allowed to divide the current block into the plurality of sub-blocks is determined based on a size of the current coding block.

7. A non-transitory computer-readable medium for storing data associated with a video signal, comprising:
a data stream stored in the non-transitory computer-readable medium, the data stream being encoded by an encoding method which comprising:
determining a partition type of a current coding block;
determining an intra prediction mode of the current coding block;
generating a prediction block based on the intra prediction mode of the current coding block;
generating a residual block by subtracting the prediction block from an original block; and
generating residual coefficients by selectively performing a transform for the residual block,
wherein, when the partition type of the current coding block is horizontal partitioning or vertical partitioning, the current coding block is divided into a plurality of sub-blocks and intra prediction is performed for each of the sub-blocks,
wherein a number of the sub-blocks generated by dividing included in the current coding block is adaptively determined to 2 or more depending on a size of the current coding block, and
wherein when the partition type of the current coding block is the horizontal partitioning or the vertical partitioning, encoding of a transform skip flag specifying whether the transform has been skipped or not is omitted and it is determined that the transform is not skipped.

* * * * *

UNITED STATES PATENT AND TRADEMARK OFFICE
CERTIFICATE OF CORRECTION

PATENT NO.      : 11,051,011 B2
APPLICATION NO. : 16/613913
DATED           : June 29, 2021
INVENTOR(S)     : Bae Keun Lee Page 1 of 1

It is certified that error appears in the above-identified patent and that said Letters Patent is hereby corrected as shown below:

In the Claims

In Claim 7, Column 34, Line 56, please replace "included in the current" with --the current--.

Signed and Sealed this
Third Day of August, 2021

Drew Hirshfeld
*Performing the Functions and Duties of the
Under Secretary of Commerce for Intellectual Property and
Director of the United States Patent and Trademark Office*